United States Patent [19]
Wick et al.

[11] Patent Number: 5,566,461
[45] Date of Patent: Oct. 22, 1996

[54] METHOD OF DETERMINING THE DIRECTION OF NORTH

[75] Inventors: Detlev J. Wick, Hamburg; Hans J. Senn, Schopfheim, both of Germany

[73] Assignee: Bodenseewerk Gerätechnik GmbH, Überlingen/Bodensee, Germany

[21] Appl. No.: 728,373

[22] Filed: Jul. 11, 1991

[30] Foreign Application Priority Data

Jul. 23, 1990 [DE] Germany ............... 40 23 349.9

[51] Int. Cl.⁶ ............................................. G01C 19/34
[52] U.S. Cl. ................................................ 33/326; 33/324
[58] Field of Search ............................... 33/275, 318, 324, 33/325, 326

[56]     References Cited

U.S. PATENT DOCUMENTS

| | | | |
|---|---|---|---|
| 3,619,905 | 11/1971 | Stier | 33/275 G |
| 3,750,300 | 8/1973 | Tumback | 33/275 G |
| 3,758,952 | 9/1973 | Fischel | 33/275 G |
| 3,806,913 | 4/1974 | Kerhoas et al. | 33/318 |
| 3,890,718 | 6/1975 | Gregerson et al. | 33/324 |
| 3,988,659 | 10/1976 | Ambrosini | 33/275 G |
| 4,075,764 | 2/1978 | Krogmann et al. | 33/324 |

FOREIGN PATENT DOCUMENTS

| | | | |
|---|---|---|---|
| 0365920 | 5/1990 | European Pat. Off. . | |
| 1941809 | 2/1971 | Germany . | |
| 1941808 | 2/1971 | Germany . | |
| 2229431 | 1/1974 | Germany . | |
| 2124357 | 11/1976 | Germany . | |
| 2545026 | 4/1977 | Germany . | |
| 2618868 | 11/1977 | Germany . | |
| 3240804 | 5/1984 | Germany . | |
| 3131111 | 5/1984 | Germany . | |
| 3045823 | 10/1988 | Germany . | |
| 3828410 | 2/1990 | Germany . | |
| 261009 | 11/1987 | Japan | 33/324 |
| 2080972 | 2/1982 | United Kingdom | 33/324 |
| 2100428 | 12/1982 | United Kingdom | 33/324 |

*Primary Examiner*—Thomas B. Will
*Attorney, Agent, or Firm*—James Creighton Wray

[57]     ABSTRACT

In a ribbon suspended meridian gyroscope in which the gyroscope restoring moment is compensated by a compensating moment, which compensating moment is measured, a North reference angle is determined from a number of different measurements taken in various azimuthal positions. In order to shorten the total measurement time required, for each current individual measurement, the degree of accuracy required for this current individual measurement is determined from the measurement results of the previous measurements in accordance with the magnitude of the effects caused by an error of the individual measurement upon the error in determining the direction of North. The current individual measurement is then carried out to this degree of accuracy. In this manner, each individual measurement is only carried out to the degree of accuracy which corresponds to the weight of this individual measurement in the total error-budget for the North-determination for the respective North reference angle. A reduction in the degree of accuracy required for a measurement, leads to a shortening of the time required for the measurement because for example an average value can be formed in a shorter period of time.

5 Claims, 3 Drawing Sheets

METHOD OF DETERMINING THE DIRECTION OF NORTH

TECHNICAL FIELD

The invention relates to a method of determining the direction of North by means of a gyroscope freely suspended from a gyroscope suspension and having its spin axis located horizontally, wherein the gyroscope restoring moment which tends to orient the spin axis of the gyroscope towards the North is compensated by a compensating moment, which compensating moment is measured, and wherein the North reference angle is determined, by taking measurements in various azimuthal positions which are determined by the slewing angle of the gyroscope suspension, from the equation $$M_{gi} = K \sin(\alpha + \gamma_i) + M_o,$$

where $M_{gi}$ = the $i^{th}$ measured value of the compensating moment
$K$ = a constant of proportionality,
$\gamma_i$ = the $i^{th}$ slewing angle
$M_o$ = the zero moment of the gyroscope suspension
$\alpha$ = the North reference angle between an apparatus reference and North.

BACKGROUND STATE OF THE ART

A meridian gyroscope suspended by a ribbon is already known from DE-A-1 941 808 and DE-A-1 941 809. Therein, the deviation of the gyroscope from the zero position of the ribbon is sensed by a pick-up device and converted into an electrical signal. This signal is applied via an amplifier to a torquer effective about the axis of the ribbon. The torquer is effective on the gyroscope to compensate for the "gyroscope restoring moment" which is effective about the axis of the ribbon on the gyroscope and which is endeavoring to orient the spin axis of the gyroscope towards the North. The exciting current for the torquer is proportional to the gyroscope restoring moment. An indicating device fed by this exciting current is provided for indicating the direction of North. In the abovementioned documents, this indicating device comprises a servo-motor by means of which the suspension ribbon is rotated until the exciting current is zero. The spin axis of the gyroscope is then oriented North whereby the gyroscope restoring moment is no longer effective. A telescope is attached to the suspension ribbon and is thus also aligned towards the North.

DE-A-2 229 431 discloses a ribbon suspended meridian gyroscope wherein the deviation of the gyroscope from the zero position of the ribbon caused by the gyroscope restoring moment is also determined by means of a pick-up and converted into an electrical signal. This signal controls via an amplifier, a servo-motor which rotates a telescope. A position indicator is coupled to the servo-motor. The signal from the position indicator is applied as a feedback signal via an amplifier to the torquer.

Finally, DE-B-21 24 357 discloses a meridian gyroscope apparatus having a gyroscope suspended by a ribbon in an intermediate housing. A pick-up produces a pick-up signal in accordance with the deviation of the gyroscope from the zero position of the ribbon. A torquer exerts on the gyroscope an opposing moment which counteracts the gyroscope restoring moment, the heavily amplified pick-up signal once again being applied to the torquer. The intermediate housing is rotatable by a servo-motor. The pick-up signal is transmitted to a storage device. After the gyroscope has been aligned, a control circuit causes a change-over switch to disconnect the pick-up signal from the pick-up and connect it to the servo-motor. A feedback circuit causes the angle through which the servo-motor is turned to be proportional to the stored pick-up signal.

The just described meridian gyroscopes permit a relatively rapid determination of the direction North. The meridian gyroscopes are mounted, as free from disturbances as possible, on a tripod which itself is firmly fixed to the ground and also protected as much as possible from vibrations. Without taking further special precautions, it is not possible to locate such meridian gyroscopes in an environment subject to disturbances such as in a vehicle.

Consequently, filtering arrangements have been developed by means of which a filtering of the signal representing a deviation from the North i.e. the torquer exciting current, takes place.

DE-A-25 45 026 discloses a ribbon suspended gyroscope having a pick-up and a torquer wherein a signal proportional to the exciting current of the torquer is digitalised in an analog-to-digital converter. The digital signal which is received at a fixed frequency is applied to a computer that forms an average value by a recursive process. The most recent recursively-determined average value is immediately supplied at the output. A filtering results from the formation of the average value. By means of the recursive formation of this average value, it is ensured that a measure for the deviation from the North is rapidly made available albeit that, in certain circumstances, it is not very precise. With increasing time however, the deviation value is constantly improved while the necessary storage capacity is kept within reasonable bounds.

A similar arrangement is disclosed in DE-A-26 18 868. There, the average value is formed from a fixed number of digital signals, that is to say the last N digital signals where N is a fixed whole number. This average value too is formed recursively.

DE-C-30 45 823 describes a method of determining the direction of North by means of a North-seeking gyroscope. A suspended body which is rotatably suspended by a universal coupling in a housing forms an outer framework. An inner framework rotatable about a vertical axis is arranged within the suspended body. A gyroscope having a horizontal spin axis is mounted within the inner framework. The inner framework is "locked" to the outer framework by a caging circuit. The caging circuit comprises a pick-up which reacts to movements of the inner framework relative to the outer framework and a torquer which is supplied with an amplified pick-up signal and exercises a torque compensating for this movement on the inner framework. In order to indicate the direction of North, this torque is measured at three different angular positions of the suspended body. The North reference angle as well as a scaling factor and the drift can be determined from the three measurements.

In the event of disturbances, e.g. vibrations in a vehicle, in which the gyroscope arrangement is located, it requires some time before the resultant measured value is available with sufficient accuracy. For three measurements, a relatively long time is thus required. On the other hand, there are some circumstances, especially military ones, where the time available for determining North is very limited.

EP-A-0 365 920 describes a filter arrangement for producing an estimated value of a measurement affected by disturbances by means of a filter which carries out a weighting of the measurement signals. This filter contains means for determining the magnitude of the disturbance and means for changing the weighting of the measurement signals in dependence on the magnitude of the disturbance. In this manner, measurement values which arise during the occurrence of a disturbance are ignored or only given little weight by the filtering action. For a caged meridian gyroscope suspended by a ribbon, its own free vibration serves as a measure of the disturbance.

DE-A-32 40 804 describes a method of determining the direction of North by means of a North-seeking gyroscope in which the gyroscope restoring moment is compensated by a counter moment of a torquer. The compensating signal is fed to a low pass filter after the formation of the average value, the differential and the amount. The output signal from the low pass filter has a constantly falling characteristic which is interrupted by disturbances. This change is detected by a check-block whose output signal then operates a switch. During undisturbed operation, the compensating signal is applied via the switch to an indicator. Upon the occurrence of a disturbance, the switch is opened.

DE-A-38 28 410 describes a filtering process for a North-seeking gyroscope having disturbance signals superimposed on the results of successive North determinations. In one time frame, it is checked whether the measurement values lie outside a predetermined maximum deviation. Only if this is not the case will the average value of the measurements taken in this time frame be supplied as corrected North indicating results.

DISCLOSURE OF THE INVENTION

The object of the invention is to reduce the time required for the taking of measurements in a method of determining North as hereinabove described.

According to the invention this object is achieved in that for a current individual measurement ($M_{gi}$), the degree of accuracy required for this current individual measurement is determined from the results ($M_{gi}-1$. .) of the previous measurements in accordance with the magnitude of the effects which an error in the current individual measurement would have upon the error in determining North (the error in the resultant North reference angle ($\alpha$)) and the current individual measurement is carried out with this required degree of accuracy.

In this manner, each individual measurement is only carried out to the degree of accuracy which corresponds to the weight of this individual measurement in the total error-budget for the North-determination for the respective North reference angle. A reduction in the degree of accuracy required for a measurement leads to a shortening of the time required for the measurement because for example an average value can be formed in a shorter period of time.

With sufficient knowledge of the constant of proportionality (K), the North reference angle ($\alpha$) can be determined from just two measurements ($M_{gi}$) if, the uncertainty in the knowledge of the constant of proportionality (K) leads to tolerable errors in the determination of North and the slewing angle ($\gamma_i$) of the positions relative to North in which the two measurements are made lies in a region permitting the determination of North with sufficient accuracy.

Thus, the procedure could be that three positions are prescribed for a three-position measurement, in a first position a coarse measurement of the directon of North is made, on the basis of this coarse measurement, a second position is so chosen, that from the two measurements, a value for the North reference angle is obtained with optimal accuracy.

Then, on the basis of an error analysis after the second measurement it can be checked whether the desired accuracy for the North reference angle has been reached from the measurements in the first and second positions.

the measurement is interrupted if this is the case.

However, it is also possible that, a maximum measuring interval has been prescribed, after the second measurement it is checked as to whether the available maximum interval has been exceeded, and if this is the case, the measurement is interrupted.

An embodiment of the invention is described below with reference to the attached drawings.

SHORT DESCRIPTION OF THE DRAWINGS

PREFERRED EMBODIMENT OF THE INVENTION

Figure 1:
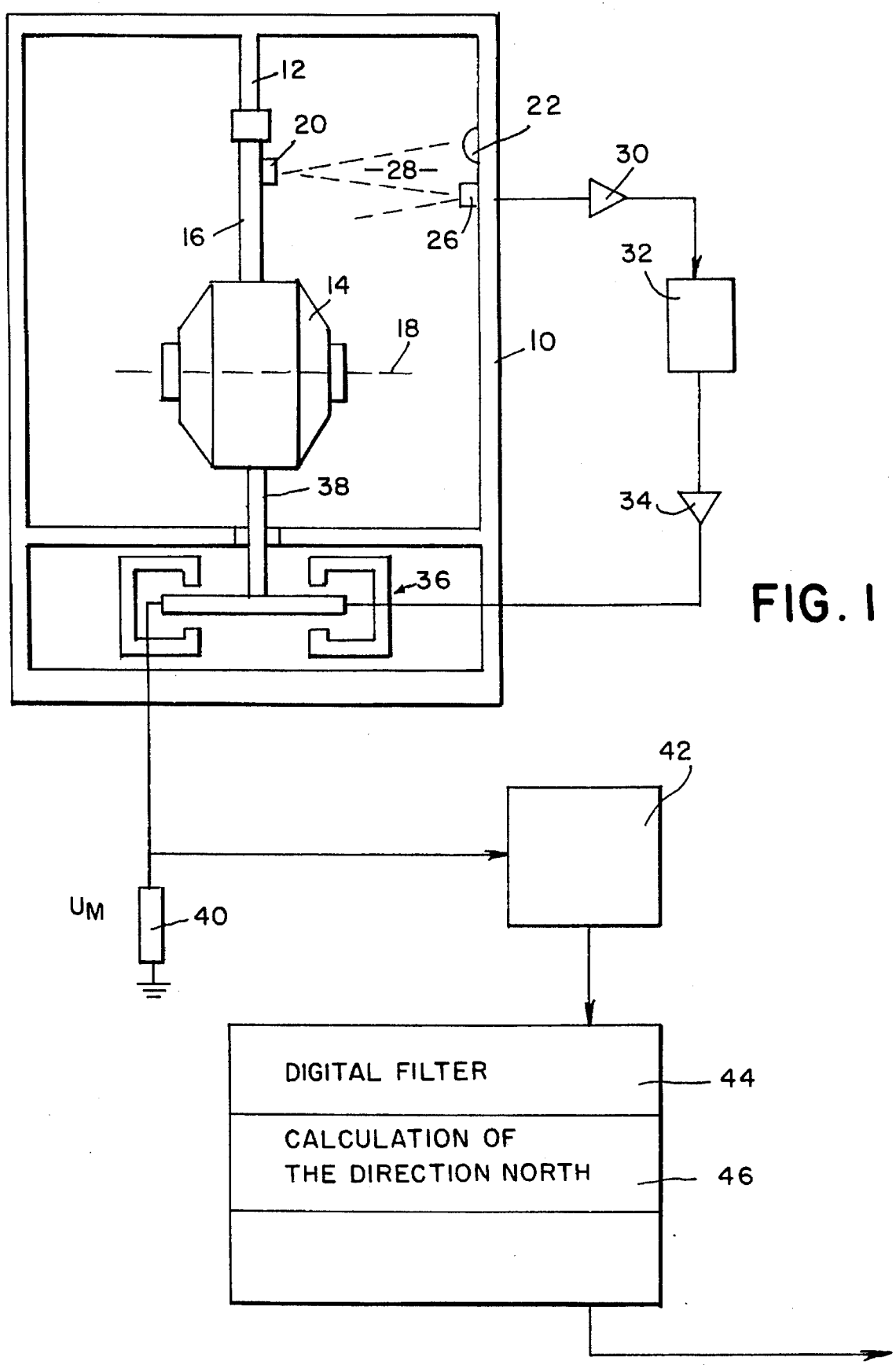
FIG. 1 is a perspective view of a ribbon suspended meridian gyroscope used in the invention.

The housing 14 of a gyroscope is suspended from a ribbon 12 in a housing 10 by means of a vertical post 16. The spin axis 18 of the gyroscope is horizontal. As a result of the rotation of the earth, a gyroscope correcting moment is effective on the gyroscope tending to align the spin axis 18 towards the North.

A mirror 20 is located on the post 16. A light source 22 transmits a beam via the mirror 20 to a photo detector arrangement 26. Light source 22, mirror 20 and photo detector arrangement 26 form a photo electric pick-up 28 which delivers a pick-up signal in accordance with the magnitude of the deflection of the gyroscope from the zero position of the ribbon. The zero position of the ribbon is rotatable relative to a reference position by rotation of the housing 10 successively into angular positions $\gamma_i$.

The pick-up signal is fed via a preamplifier 30, a phasing network 32 and a power amplifier 34 to a torquer 36. The armature of the torquer 36 is coupled to the gyroscope housing 14 via a rod 38 which is attached to the under side thereof and is co-axial with the post 16. The torquer exercises on the housing 14 a torque which acts against the gyroscope correcting moment and practically compensates this gyroscope correcting moment. Consequently, the gyroscope is electrically locked at the zero position of the ribbon. The torque, and thereby the characteristic of the torquer 36 as well as the related amplified pick-up signal, depends on the angle between the spin axis 18 and North and thus, in effect, on the angle between the ribbon zero position and North, in accordance with the measurement equation $$M_{gi} = K \sin(\alpha+\gamma_i) + M_o,$$

where $M_{gi}$=the $i^{th}$ measured value of the compensating moment

K= a constant of proportionality, $\gamma_i$=the ith slewing angle $M_o$=the zero moment of the gyroscope suspension $\alpha$=the North reference angle between an apparatus reference and North.

The amplified pick-up signal is measured by means of the voltage drop $U_m$ across a measuring resistor 40 which is in series with the torquer. This voltage drop $U_m$ is proportional to the pick-up signal.

With the aid of an analog-digital converter 42, the voltage drop $U_m$ is sampled with a periodicity T and converted into a digital signal having the form of a 12 bit word. This digital signal is supplied to a digital filter 44 which abstracts an average value.

The average value is formed in the filter 44 from the N most recent samples of the measurement values $U_m$ in accordance with the recursive formula $$U_m(nT) = U_m((n-1)T) + \frac{1}{N} U_m(nT) - U_m((n-N) \cdot T) \quad (2)$$

This is described in DE-A-26 18 868 and U.S. Pat. No. 4,075,764. In order that each time only the last N measurement values are taken into consideration, the initial values deviating greatly from the final state as a result of initial transient are left out of account to an increasing degree with increasing "n". The error in the thus obtained average value $U_m(nT)$ will therefore be the smaller, the greater the value of "n". A most possibly accurate determination of the measured value of the compensating moment thus requires a longer time span. The formation of the average value continues until the difference betwen successive average values is smaller than a specific predetermined error $\epsilon$. In the method according to the invention, the compensating moment is determined in three different angular positions of the apparatus reference measured about a vertical axis. These angular positions are predetermined by the angle $\gamma_i$, i.e. $\gamma_1$, $\gamma_2$ and $\gamma_3$. Thus from the obtained measured values $M_{g1}$, $M_{g2}$ and the three equations for the three unknowns K, $M_o$ and a we obtain:

$$M_{g1} = K \sin(\alpha+\gamma_1) + M_o, \quad (3)$$

$$M_{g2} = K \sin(\alpha+\gamma_2) + M_o, \quad (4)$$

$$M_{g3} = K \sin(\alpha+\gamma_3) + M_o, \quad (5)$$

From these, the three unknowns can be determined. In particular, the North reference angle $\alpha$ can be determined. Next, $$dM_{gi} = K \cos(\alpha+\gamma_i) d\alpha \quad (6)$$

or $$d\alpha = \frac{dM_{gi}}{K \cos(\alpha+\gamma_i)} \quad (7)$$

Thus then, an error in $M_{gi}$ has different effects on the measurement of the North reference angle $\alpha$ in accordance with the magnitude of the North reference angle $\alpha$. If $\alpha+\gamma_i=90°$, then $\cos(\alpha+\gamma_i)=0$ and $\sin(\alpha+\gamma_i)=1$. The sine is thus maximum. A small change of the North reference angle causes virtually no change in the gyroscope correcting moment or the measured compensating moment $M_{gi}$. Put another way: An error in the measured compensating moment $M_{gi}$ causes a large error in the determination of the North reference angle $\alpha$. If on the other hand $\cos(\alpha+\gamma_i)=1$, i.e. $\sin(\alpha+\gamma_i)=0$, then $$dM_{gi} = K \cdot d\alpha \quad (8)$$

$$d\alpha = \frac{dM_{gi}}{K} \quad (9)$$

An error in the determination of $M_{gi}$ has a more limited effect (1/K) than an error in the measurement of the North reference angle $\alpha$.

However, if the effect on the measurement of the wanted North reference angle of an error in the measurement of the compensating moment $M_{gi}$ at a particular position $\gamma_i$ of the ribbon suspended meridian gyroscope has a more or less smaller weight in comparison to the measurements in other positions, then there is no point in measuring the compensating moment at this position of the meridian gyroscope with the same degree of accuracy as in the other positions. As was described above in connection with the signal processing of U.S. Pat. No. 4,075,764, greater accuracy necessitates a larger value of "n" and thus a longer measuring time period. Thus, in those cases in which it is apparent from the previous measurements that the current measurement of $M_{gi}$ will have a lesser weight in the measurement, it is possible to interrupt the measurement after a smaller number "n" and consequently to effect it more quickly although possibly with a larger error.

Essentially then, the method consists of the following steps:

(a) The ribbon suspended meridian gyroscope with the housing 10 is brought into a first position in which a housing reference e.g. the zero position of the ribbon, forms a predefined angle with a fixed reference direction.

(b) In this position, the compensating moment $M_{g1}$ is measured by the formation of an average value according to equation (2).

(c) From the measured compensating moment $M_{g1}$, an estimated value $\hat{\alpha}$ for the North reference angle $\alpha$ is determined using the approximately known value of the constant of proportionality K and the similarly approximately known value of the zero moment $M_o$.

(d) From the estimated value $\hat{\alpha}$ for the North reference angle $\alpha$, a weight is determined from equation (7) with which, in the succeeding second measurement in angular position $\gamma_2$, an error $dM_{g2}$ of the compensating moment would be effective as an error in the North reference angle being measured.

(e) A degree of accuracy for this measurement is predefined, i.e. a permissible error of $M_{g2}$, which will be the smaller, the greater the weight of the second measurement as determined from the estimated value $\hat{\alpha}$ of the North reference angle $\alpha$.

(f) The housing 10 of the ribbon suspended meridian gyroscope is moved into a position in which the apparatus reference forms an angle $\gamma_2$ with the fixed reference direction.

(g) In this position, the compensating moment $M_{g2}$ is measured in the manner described above whereby the formation of the average value is interrupted and the measurement value immediately emitted if the difference between two immediately succeeding averages falls below the prescribed permissible error.

(h) A weight is determined from the estimated value $\hat{\alpha}$ for the North reference angle a resulting from the first measurement (or an estimated value obtained from the second meaurement) with which, in the succeeding third measurement in the angular position $\gamma_3$, an error $dM_{g3}$ of the compensating moment would be effective on the North reference angle $\alpha$ being measured.

(i) A degree of accuracy for this third measurement is predefined, i.e. a permissible error of $M_{g3}$, which will be the smaller, the greater the weight of the third measurement as determined from the estimated value of the North reference angle.

(j) The housing 10 of the ribbon suspended meridian gyroscope is moved into a position in which the apparatus reference forms an angle $\gamma_3$ with the fixed reference direction.

(k) In this position, the compensating moment $M_{g3}$ is measured in the manner described above whereby the formation of the average value is interrupted and the measurement value immediately emitted if the difference between two immediately succeeding averages falls below the permissible error prescribed for the third measurement.

(l) The North reference angle $\alpha$ is determined from the resulting three measurements $M_{g1}$, $M_{g2}$ and $M_{g3}$ in accordance with the equations (3), (4) and (5).

The signal processing is effected by means of a digital computer which is represented in the Figure by the blocks "digital filter" 44 and "calculation of the direction North" 46. The computer calculates the estimated value $\hat{\alpha}$ of the North reference angle and the permissible errors for the second and third measurements from the measurement value $M_{g1}$ of the first measurement. The computer monitors the average values being formed and causes the formation of the average values to be interrupted and the emission of the measurement value if the difference between successive average values falls below the calculated permisible error. The computer also controls via a (not shown) servo motor, the turning of the housing 10 into the various angular positions.

Figure 2:
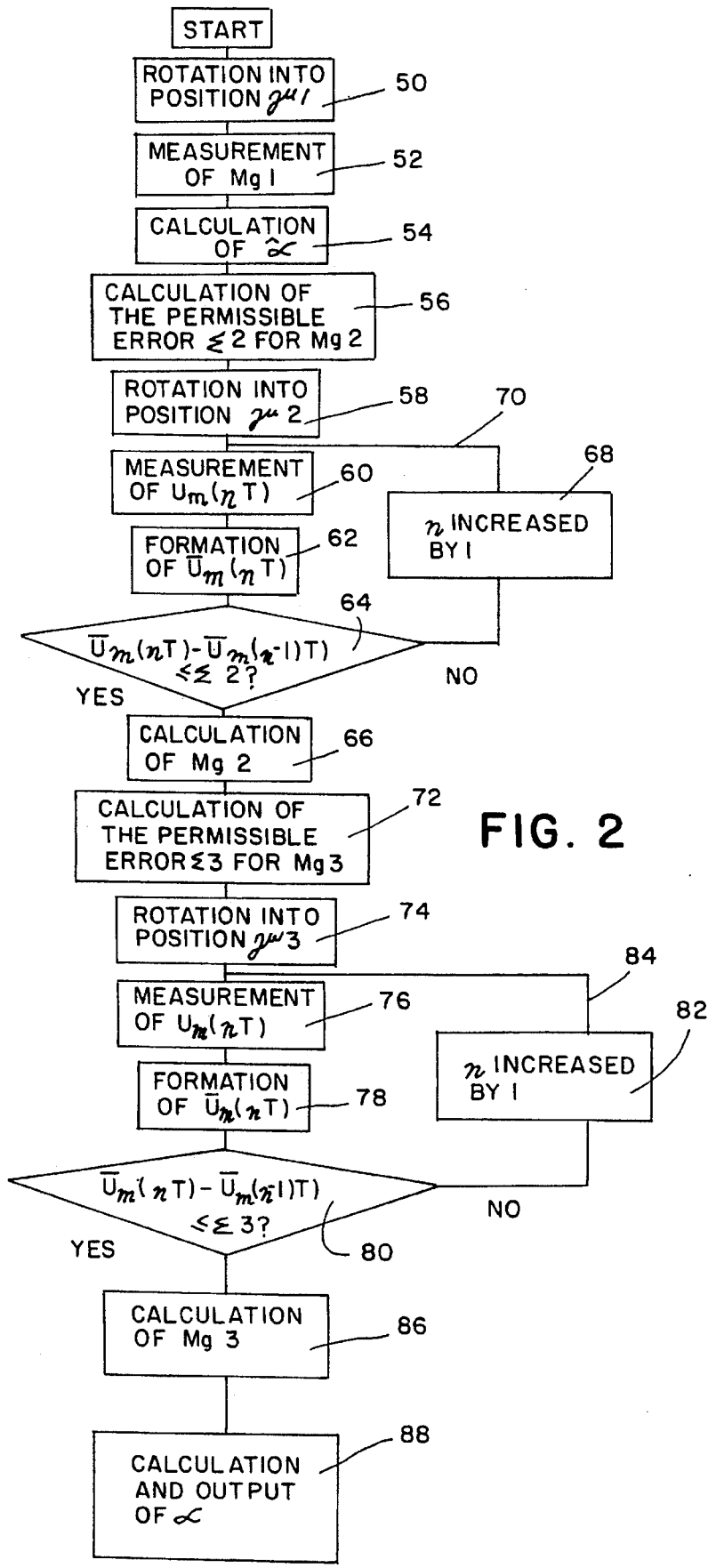
FIG. 2 is a flow diagram of the control and signal processing for the determination of the direction North.

The signal processing and the controlling function are depicted in the flow diagram of FIG. 2.

Block 50 represents the rotation of the meridian gyroscope into its first position which is dedetermined by the angle $\gamma_1$. As represented by block 52, the compensating moment $M_{g1}$ is measured in this position. The estimated value of the North reference angle $\hat{\alpha}$ is then determined from the compensating moment $M_{g1}$ as represented by block 54. Depending upon the weight of an error in $M_{g1}$, the permissible error $\epsilon_2$ for the measured compensating moment $M_{g2}$ is determined from the estimated value $\hat{\alpha}$. This is represented by block 56. Block 58 represents the subsequent rotation of the meridian gyroscope into its second position which is defined by the angle $\gamma_2$, whereafter, the determination of $M_{g2}$ occurs. Then, at periodic intervals T, the value U of the falling potential U across the resistance 40 is sampled and digitalised. The value sampled during the nth sampling interval is U (nT). The recording of U (nT) is represented by block 60. The average value U (nT) is then formed from U (nT) and the preceding values of U in accordance with equation (2), as represented by block 62. In the lozenge 64, it is checked whether the difference (U (nT)–U (n–1)T) between successive average values is less than or equal to the calculated permisible error $\epsilon_2$ i.e. $\epsilon_2 \leq \epsilon_o$. If the result of the check is positive ("YES"), the compensating moment $M_{g2}$ is calculated from the average value of U (nT) according to block 66. The flow diagram then proceeds downwardly in a straight line. If the result of the check is negative ("NO"), "n" is increased by 1 i.e. a further sample of U is used for calculating the average value and the just-described procedure is repeated. This is represented by block 68 located in the loop 70 extending from the "input" of block 60.

After calculation of the compensating moment $M_{g2}$ from the average value of U (nT), the permissible error $\epsilon_3$ for the third measurement is calculated according to block 72. Block 74 represents the rotation of the meridian gyroscope into the third position as defined by angle $\gamma_3$.

Once again, the formation of the average value of the sampled and digitalised value U of the decreasing potential $U_M$ across the resistance 40 is effected. For this purpose, block 76 corresponds to the block 60 for the second measurement. Block 78 corresponds to block 62. Lozenge 80 corresponds to lozenge 64, block 82 corresponds to block 68 and loop 84 corresponds to loop 70.

In accordance with block 86, the compensating moment $M_{g3}$ is calculated from the average value. Block 88 represents the calculation of the North reference angle a as per equations. (3), (4) and (5).

In many cases, the constant of proportionality is known with sufficient accuracy. In this case, the North reference angle can be determined from two measurements in accordance with equations (3) and (4). A prerequisite is that the uncertainty in the knowledge of the constant of proportionality K should lead to an acceptable error in the determination of the direction North. A further prerequisite is that the slewing angle between the two positions at which measurements are taken should lie in a region permitting the determination of North with sufficient accuracy.

The procedure for this is as follows:

(a) Initially, three positions for a three-position measurement are predetermined as in the method described above.

(b) The ribbon suspended meridian gyroscope with the housing 10 is brought into a first position in which a housing reference e.g. the zero position of the ribbon, forms a predetermined angle $\gamma_1$ with a fixed reference direction.

(c) In this position, the compensating moment $M_{g1}$ is measured by the formation of an average value according to equation (2).

(d) From the measured compensating moment $M_{g1}$, an estimated value $\hat{\alpha}$ for the North reference angle $\alpha$ is determined by a coarse measurement using the assumed known value of the constant of proportionality K and the similarly approximately known value of the zero moment $M_o$.

(e) On the basis of this coarse measurement, a second position for a second measurement is selected from the three predetermined positions such that a North reference angle can be determined with optimal accuracy from the first and second measurements.

(f) An error analysis is carried out after the second measurement wherein it is checked whether the accuracy of the North reference angle obtained from the first and second measurements suffices.

(g) If this is the case, the measurement is interrupted.

(h) $\alpha$ is determined from the two measurements.

(i) The North reference angle $\alpha$ is emitted.

If the error analysis indicates that the accuracy achieved by the first and second measurements is not sufficient then a third measurement is carried out.

Figure 3:
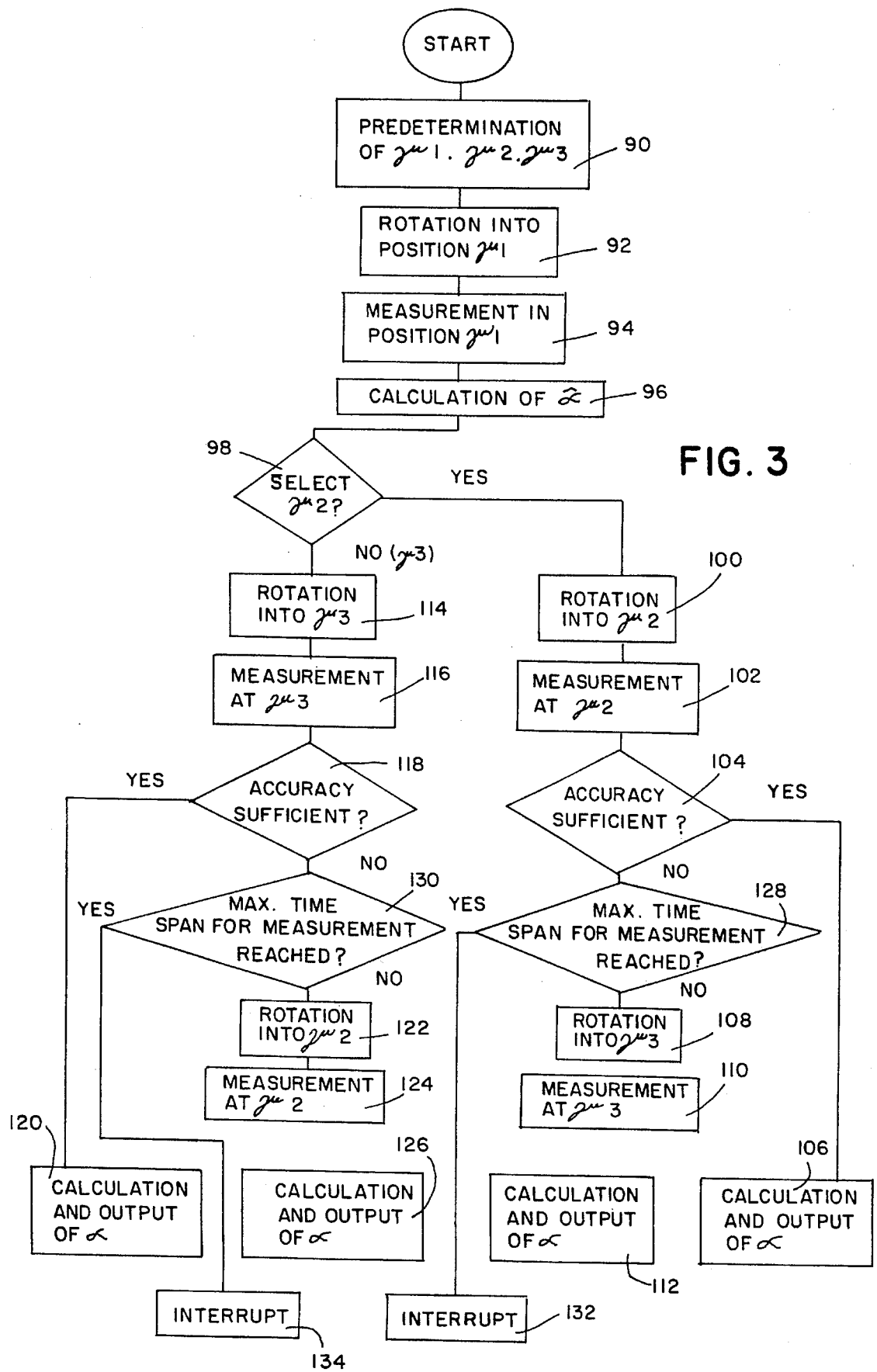
FIG. 3 is a flow diagram of the control and signal processing in a modified form of the method according to the invention.

This procedure is shown in FIG. 3 in the form of a block diagram:

Three positions defined by the angles $\gamma_1$, $\gamma_2$ and $\gamma_3$ are prescribed as indicated by block 90. The meridian gyroscope is rotated into the first position. This is represented by block 92. A measurement of the compensating moment $M_{g1}$ occurs in position 1. This is represented by block 94. Then in accordance with block 96, an estimated value $\hat{\alpha}$ of the North reference angle is determined from the measured compensating moment.

Lozenge 98 represents the selection of $\gamma_2$ as the second measuring position. "NO" indicates the selection of $\gamma_3$ as the second measuring position if this should be necessary.

If $\gamma_2$ is selected, the flow diagram follows the right-hand branch. The meridian gyroscope is rotated into the position $\gamma_2$ as indicated by block 100. A measurement is taken in position $\gamma_2$. This is represented by block 102. The evaluation of the error is represented by the lozenge 104 "Accuracy sufficient?". If the error evaluation is positive i.e. "YES", the calculation and emission of the North reference angle a takes place as indicated by block 106. If the result is negative, the meridian gyroscope is rotated into the position $\gamma_3$. This is represented by block 110. The measurement effected at this position is represented by block 110. The calculation and emission of the North reference angle a is represented by block 112.

In the case of non-selection of $\gamma_2$ (and thus, the selection of $\gamma_3$), the flow diagram follows the left-hand branch in FIG. 3. The left-hand branch is identical with the right-hand branch, the functions of $\gamma_2$ and $\gamma_3$ merely being interchanged. The blocks 114 and 116 correspond to the blocks 100 and 102 but changed to $\gamma_3$. Lozenge 118 corresponds to lozenge 104. Block 120 corresponds to block 106. The blocks 122 and 124 correspond to the blocks 108 and 110 but changed to $\gamma_2$. Block 126 corresponds to block 112.

For the measurements in positions $\gamma_2$ and $\gamma_3$, a matching of the required accuracy and the weight of an error in the current measurement value while calculating the North reference angle $\alpha$ is effected as described above in connection with FIG. 2.

There are cases, in which a maximum measuring period is prescribed. If this measuring period cannot be maintained e.g. because the meridian gyroscope is being subjected to strong vibrations, the measurement must be interrupted. Such cases occur especially in military applications. In this case, after the second measurement, it is checked whether the maximum time available for taking the measurement has been exceeded. If this is the case, the measurement is interrupted.

This is indicated in FIG. 3 by the respective lozenges 128 and 130 in the right- and left-hand branches. After the measurement in the position $\gamma_2$ (block 102), and if the accuracy is still insufficient (lozenge 104 "NO"), lozenge 128 checks whether the maximum measuring period has already been exceeded. If this is not the case ("NO"), then the flow diagram proceeds further via blocks 108, 110 and 112. If however, the maximum measuring period has already been exceeded ("YES"), the measurement is interrupted in accordance with block 132.

The lozenge 130 between the "NO-output" of the lozenge 118 and the block 122 and the block 134 at the "YES-output" of the lozenge 130 have the same functions in the left-hand branch of the flow diagram.

We claim
1. A method of determining the direction of North by means of a gyroscope freely suspended from a gyroscope suspension and having its spin axis located horizontally, wherein a gyroscope restoring moment which tends to orient the spin axis of the gyroscope towards the North is compensated by a compensating moment, and, wherein a North reference angle is determined, by taking compensating moment measurements in various azimuthal positions which are determined by a slewing angle of the gyroscope suspension, from the equation $$M_{gi} = K \sin(\alpha + \gamma_i) + M_o,$$

where
$Mg_{gi}$=the $i^{th}$ measured value of the compensating moment
K=a constant of proportionality,
$\gamma_i$=the $i^{th}$ slewing angle
$M_o$ = the zero moment of the gyroscope suspension
$\alpha$=the North reference angle between North and a reference device, characterized in that for a current individual measurement $M_{gi}$, a degree of accuracy required for said current individual measurement is determined from the results $M_{gi-1}$ .. of the previous measurements in accordance with the magnitude of the effects which an error in the current individual measurement would have upon the error in determining North the error in the resultant reference angle $\alpha$ and the current individual measurement is carried out to said required degree of accuracy.

2. A method according to claim 1 characterized in that with sufficient knowledge of the constant of proportionality K, the North reference angle $\alpha$ is determined from just two measurements $M_{gi}$, if, the uncertainty in the knowledge of the constant of proportionality K leads to tolerable errors in the determination of North and the slewing angle $(\gamma_i)$ $\gamma_i$ of the positions relative to North in which the two measurements are made, lies in a region permitting the determination of North with sufficient accuracy.

3. A method according to claim 2 characterised in that three positions are prescribed for a three-position measurement, in a first position a coarse measurement of the directon of North is made, on the basis of this coarse measurement, a second position is so selected that, from the two measurements, a value for the North reference angle is obtained with optimal accuracy.

4. A method according to claim 3 characterised in that on the basis of an error analysis after the second measurement, it is checked whether the desired accuracy for the North reference angle has been reached from the measurements in the first and second positions the measurement is interrupted if this is the case.

5. A method according to claim 3 characterised in that a maximum measuring interval is prescribed, after the second measurement, it is checked as to whether the available maximum interval has been exceeded, and the measurement is interrupted if this is the case.

* * * * *